No. 693,025. Patented Feb. 11, 1902.
R. W. JESSUP.
SEPARATOR.
(Application filed Nov. 18, 1899.)

(No Model.)

Witnesses
Walter F. Vane.
D. B. Richards

Inventor
Robert W. Jessup,
by Wm. F. Booth,
his Attorney.

THE NORRIS PETERS CO., PHOTO-LITHO., WASHINGTON, D. C.

UNITED STATES PATENT OFFICE.

ROBERT W. JESSUP, OF SAN FRANCISCO, CALIFORNIA, ASSIGNOR, BY DIRECT AND MESNE ASSIGNMENTS, TO SPIRAL BELT SEPARATOR CO., OF SAN FRANCISCO, CALIFORNIA, A CORPORATION OF CALIFORNIA.

SEPARATOR.

SPECIFICATION forming part of Letters Patent No. 693,025, dated February 11, 1902.

Application filed November 18, 1899. Serial No. 737,416. (No model.)

*To all whom it may concern:*

Be it known that I, ROBERT W. JESSUP, a citizen of the United States, residing in the city and county of San Francisco and State of California, have invented certain new and useful Improvements in Separators; and I do hereby declare the following to be a full, clear, and exact description of the same.

My invention relates to the class of separators especially adapted for the separation of grains and other small seeds and in which the separation is the result of differences in the shape of the particles.

My invention is especially intended to remove oats and straw from wheat; and in this application its utility will be found to be highest in connection with and as a preliminary to the use of the needle-screen separators illustrated in Letters Patent Nos. 576,195, 608,049, and 612,243, granted upon my applications dated February 2, 1897, July 26, 1898, and October 11, 1898, respectively, and in a subsequent application by me for patent for improvements in separators, Serial No. 688,894, filed August 18, 1898, and allowed July 7, 1899.

The object of my present invention is not so much as a rough scalper, for as such it is not needed, but as a means for more finished work, and for this it will be particularly useful.

My invention consists in the novel combinations hereinafter described and claimed.

Figure 1:
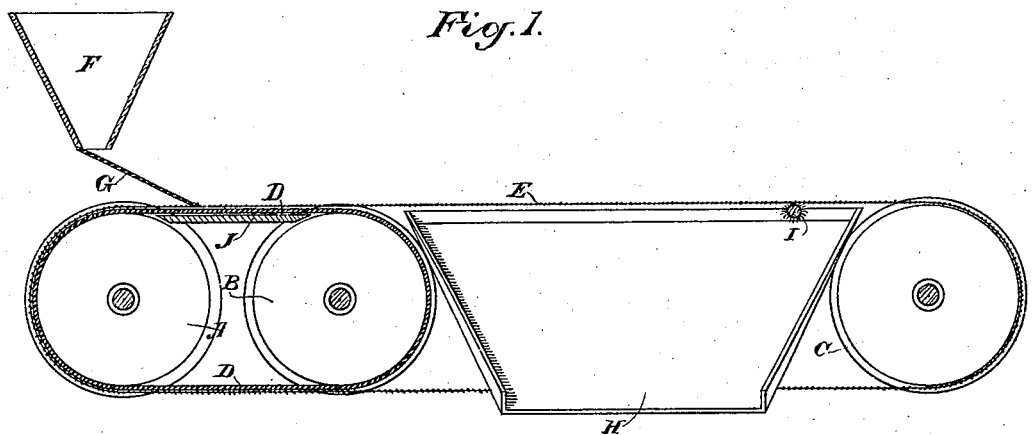
Figure 2:
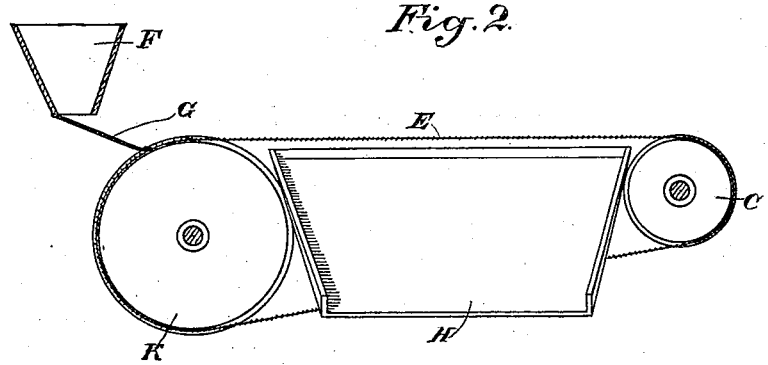

Referring to the accompanying drawings, Figure 1 is a vertical longitudinal section of my separator. Fig. 2 is a similar section of a modification of my separator.

In order to fully understand my invention, it will be best to preface the description by a few remarks as to the nature of the separation I aim at. Mixed with the wheat-kernels before any cleaning is done there are often oats, barley, straws, and other foreign matter. Now if upon a reciprocating screen, particularly if of an open or free character, such uncleaned wheat be fed in the customary manner the agitation of the material, due to the motion of the screen, tends to upend much of the oats and barley and short straws, so that they pass with the wheat through spaces in the screen that they otherwise would bridge. If to remedy this a less open screen be used, too many kernels of wheat are liable to flow over the tail end of the screen with the barley, oats, &c.; but if a screen, even a very free one or one very foraminous, be placed upon an imperforate bottom and wheat mixed with oats, barley, and straw be distributed on said screen an accurate separation can be made by lifting the screen up from the imperforate bottom, provided care be taken while lifting not to jar the screen or agitate the material lying thereon. An examination of this separation will show that the wheat has passed through the spaces in the screen and has been left upon the imperforate bottom, while the straw, oats, barley, &c., have been lifted up with the screen. This method of separation is superior to the separation by the ordinary reciprocating screen by as much of the oats, barley, and short straws that would have gone through the screen mesh because of having been upended by the agitation they would have been subjected to while passing over the ordinary shaking-screen. This non-agitation of material after delivery to the screen is the essence of my invention. I have applied it practically in the form illustrated in the accompanying drawings.

A and C are two rollers, and B is an intervening roller. Upon rollers A and B is mounted a belt D, traveling in the direction indicated. Over this belt and upon rollers A and C is mounted an endless screen E, traveling in the same direction and at the same speed as belt D. The endless screen E is flat, or substantially so, and it is mounted in a plane which is horizontal or which is a departure therefrom by such an inclination as will still carry out the separation herein intended, and for this reason its disposition may be termed a "substantially horizontal" one. A feeder F, of any suitable construction, is arranged to deliver the grain upon the screen near roller A. A suitable device, such as G, which may be a leather apron or other flap or strip, rests upon the screen, which agitates it, causing an even feed. Suitable directing-chutes, such as H, just beyond roller B, are arranged to receive and direct the wheat. When desired, a bristle brush, as at I, is arranged to operate under the screen beyond where the discharge of wheat occurs. Its object is this: When the grain is spread over the screen before reaching where the wheat discharges, kernels of wheat are liable to rest on the kernels of oats, or barley, or straws and do not drop when passing over where the wheat should fall. The brush is to gently disturb the position of the kernels of oats, barley, or straw, turning the wheat off the underlying kernel.

In order to furnish a firmer support under the belt D, between the rollers A and B, there is placed a fixed table J.

Now the material being fed to the screen E rather gently and spread over it comparatively evenly in a thin layer finds rest upon said screen and its bottom, (the belt D,) because the two move together at the same speed. There is no disturbance or agitation after delivering to the screen; but when the upper extremity of the vertical diameter of roller B is reached the screen and its bottom separate by the falling away of the belt D. This separation is without jar and is the equivalent in the result to the careful lifting of the screen which I have heretofore mentioned. Immediately the wheat drops from both screen and bottom and is disposed of by the chutes; but the oats, barley, and straw remain undisturbed. No jar or motion has affected them and they continue on to discharge or until the brush causes the oats or barley to fall through.

The table J merely serves to stiffen the belt or bottom D and, while practical, is not essential to the principle of the invention.

The screen I prefer to use is a wire belt, well known in commerce. It is a particularly open-meshed fabric, and serves the purpose well. Suitable framework carries the device, and it may be supposed that roller C is the driver. The belt D may be of any suitable character, such as a rubber belt.

A slight modification of the separator is shown in Fig. 2, wherein the imperforate bottom instead of being a traveling belt, as before described, is a roller K, which for the distance the screen lies upon and travels with it serves as a bottom in the same manner as the belt D.

Having thus described my invention, what I claim as new, and desire to secure by Letters Patent, is—

1. A separator, comprising a traveling, substantially, horizontally disposed, flat screen, an imperforate bottom therefor, lying in contact therewith, and traveling, for a time, with said screen, means for feeding the material to the screen at a point where screen and bottom are together, and means for causing divergence of said screen and bottom.

2. A separator, comprising an endless traveling screen, mounted upon terminal rollers, an imperforate bottom in contact with said screen, and traveling, for a time, therewith, means for feeding the material to the screen at a point where screen and bottom are together, and means for causing divergence of said screen and bottom in the direction of the motion of the screen.

3. A separator, comprising an endless traveling screen, terminal rollers upon which said screen is mounted, an endless traveling imperforate bottom, under, and in contact with the screen, and mounted, at one end, upon one of the terminal rollers of, and directly beneath the endless screen, a roller intermediate the terminal rollers of the screen, upon which said intermediate roller the other end of the traveling bottom is mounted, whereby said bottom travels, for a time, with said screen, and diverges therefrom in the direction of the motion of the screen, and means for feeding the material to the screen at a point where screen and bottom are together.

4. A separator, comprising an endless traveling screen, terminal rollers upon which said screen is mounted, an endless traveling imperforate bottom, under, and in contact with the screen, and mounted, at one end, upon one of the terminal rollers of, and directly beneath the endless screen, a roller intermediate the terminal rollers of the screen, upon which said intermediate roller the other end of the traveling bottom is mounted, whereby said bottom travels, for a time, with said screen and diverges therefrom in the direction of the motion of the screen, a means for feeding the material to the screen at a point where screen and bottom are together, and a fixed table, to hold the imperforate bottom to the screen, for the time it travels therewith.

In witness whereof I have hereunto set my hand.

ROBERT W. JESSUP.

Witnesses:
MILLIE SPYER,
BERNARD GREENSFELDER.